United States Patent [19]

DiFrank et al.

[11] Patent Number: 4,480,984
[45] Date of Patent: Nov. 6, 1984

[54] APPARATUS FOR HEAT-SHRINKING THERMOPLASTIC SLEEVES ABOUT GLASS CONTAINERS

[75] Inventors: Frank J. DiFrank, Toledo; Fred L. Wallington, Perrysburg, both of Ohio

[73] Assignee: Owens-Illinois, Inc., Toledo, Ohio

[21] Appl. No.: 530,456

[22] Filed: Sep. 9, 1983

[51] Int. Cl.³ .................... B29C 17/00; B29C 27/00
[52] U.S. Cl. .................. 425/508; 156/443; 425/174.4
[58] Field of Search ........... 156/443; 425/174.4, 425/508, 502

[56] References Cited

U.S. PATENT DOCUMENTS

| | | | |
|---|---|---|---|
| 3,523,052 | 8/1970 | Bolen | 156/443 |
| 3,801,246 | 4/1974 | Gustavsson | 425/174.4 |
| 3,802,942 | 4/1974 | Amberg et al. | 156/443 |
| 4,243,466 | 1/1981 | Lindee | 156/443 |
| 4,260,567 | 4/1981 | Poppe et al. | 425/174.4 |
| 4,318,685 | 3/1982 | Konstantin | 425/508 |
| 4,325,767 | 4/1982 | Graves et al. | 156/443 |
| 4,412,876 | 11/1983 | Lerner et al. | 156/443 |

*Primary Examiner*—Willard E. Hoag
*Attorney, Agent, or Firm*—Gerald T. Welch; Myron E. Click

[57] ABSTRACT

Apparatus for accepting preheated or ambient containers in single file to an eighteen-head handling turret that will carry the containers through a generally circular path by their necks. The containers are transported through 320° of the circle described by the chuck-carrying turret. The other 40° of the circle is the zone where the chucks are open and the containers that are labeled move away from the turret and heated containers are entering. The chucks are rotated about their axes by a chain-driven mechanism, and while rotated, pass between spaced ovens to shrink theremoplastic sleeves about the containers.

19 Claims, 10 Drawing Figures

APPARATUS FOR HEAT-SHRINKING THERMOPLASTIC SLEEVES ABOUT GLASS CONTAINERS

The present invention relates to a machine for receiving ambient or preheated glass containers moving in an upright attitude on a conveyor belt which moves the containers in series into a machine for grasping the necks of the containers. The machine then takes the containers held by their necks and conveys them through approximately 320° of movement about a central vertical axis. During movement through this circular path, the container will receive a thermoplastic shrinkable sleeve thereabout and the sleeve will be shrunk about the container and then the container with the applied sleeve will be released to move on an outgoing conveyor belt similar to the incoming belt.

BACKGROUND OF THE INVENTION

It has been the practice in the past to provide apparatus to form a sleeve of thermoplastic material on a series of rotatable sleeve-forming mandrels that are carried on a circular turret, for example, as shown in U.S. Pat. No. 3,802,942 issued Apr. 9, 1974. This patent discloses the process of forming sleeves from the point where a foamed material is extruded as a tube, then slit into a flat sheet. The sheet is provided with a stretch orientation in the direction of its width by reason of its being inflated as it is extruded in tube form. The inflation of the tube stretches the tube in a circumferential direction and this provides the built-in shrinkage characteristic which is desired. Thus, when the material is formed into a cylinder with the direction of shrink extending circumferentially about the cylinder and this cylinder or sleeve is then applied to the container, heating of the sleeve will shrink the sleeve into conformity to the external surface of the container.

The method and apparatus for producing the shrink sleeves used in the present invention is essentially the same as that disclosed in the above-referred-to U.S. Pat. No. 3,802,942, and reference to such patent may be had and the disclosure of this patent is incorporated herein by reference. FIGS. 1 and 2 of this patent show two essentially similar systems, in plan view, wherein sleeving material 15a is brought into association with preheated containers at the turret 58. At turret 58 the material is formed on mandrels into sleeves and then put onto glass containers, and the containers with the sleeves thereon exit from the mandrel and pass through a heat-shrink oven 77 on their way to an exit conveyor 81. The newly formed or preheated containers are picked up at the end of a feed screw 53 in both FIG. 1 and FIG. 2 embodiments of this patent. It should be pointed out that in this patent the containers, at the point of pickup and throughout their entire travel through the ovens and the sleeving operation, are carried by an individual set of tongs carried on an endless chain-drive system. There are as many tongs as there are positions along the length of the chain used to convey the bottles. The bottles are spaced apart a fixed distance, depending on the spacing of the tongs. Thus, the above-referred-to patent discloses an endless pair of chains, carrying a series of neck-grasping chucks for holding the necks of the containers through the cycle of operation of preheating the containers, applying a shrinkable sleeve to the container and subsequently heat-shrinking the sleeve that has been applied to the container. It will be noted that in this patent the shrinking of the sleeve takes place in a long straight line moving away from the turret where the sleeves have been formed and applied to the container. This patent also provides a clear teaching of a bottle-handling system where a relatively tall set of tong-transporting mechanisms are used to pick up the containers, on the fly, and drop the containers, on the fly, with the tong mechanism having the ability to be raised and lowered and opened and closed while moving in the straight line motions.

SUMMARY OF THE INVENTION

Apparatus for handling containers that are to receive heat-shrinkable plastic sleeves applied thereto, through 320° of movement about a central axis while rotating the containers about their axes as they move through a semiannular heat zone with the container neck-grasping mechanism comprising a plurality of rotatable chucks that are opened and closed by stationary cams as the chucks are transported by a rotating platform, and the chucks are sequentially opened and closed to release sleeved containers and then grasp incoming containers in a smooth transport system.

It is a further object of the invention to provide a plural chuck mechanism in which the chucks carry sprockets that are each driven by a chain engaging the sprockets through the desired portion of the cycle, with the chains being guided away from the chucks during the non-rotating portion of the chuck movement about the axis of the main supporting mechanism.

It is a still further object of the invention to provide a bottle transporting system in which the bottles are serially engaged by chucks that are cammed open and closed during the movement of the chucks about a central axis and selective rotation of the chucks as they are being moved to provide an even shrinkage of the sleeves about the containers.

Other and further objects will be apparent from the following description taken in conjunction with the annexed sheets of drawing.

DETAILED DESCRIPTION OF THE DRAWINGS

Figure 1:
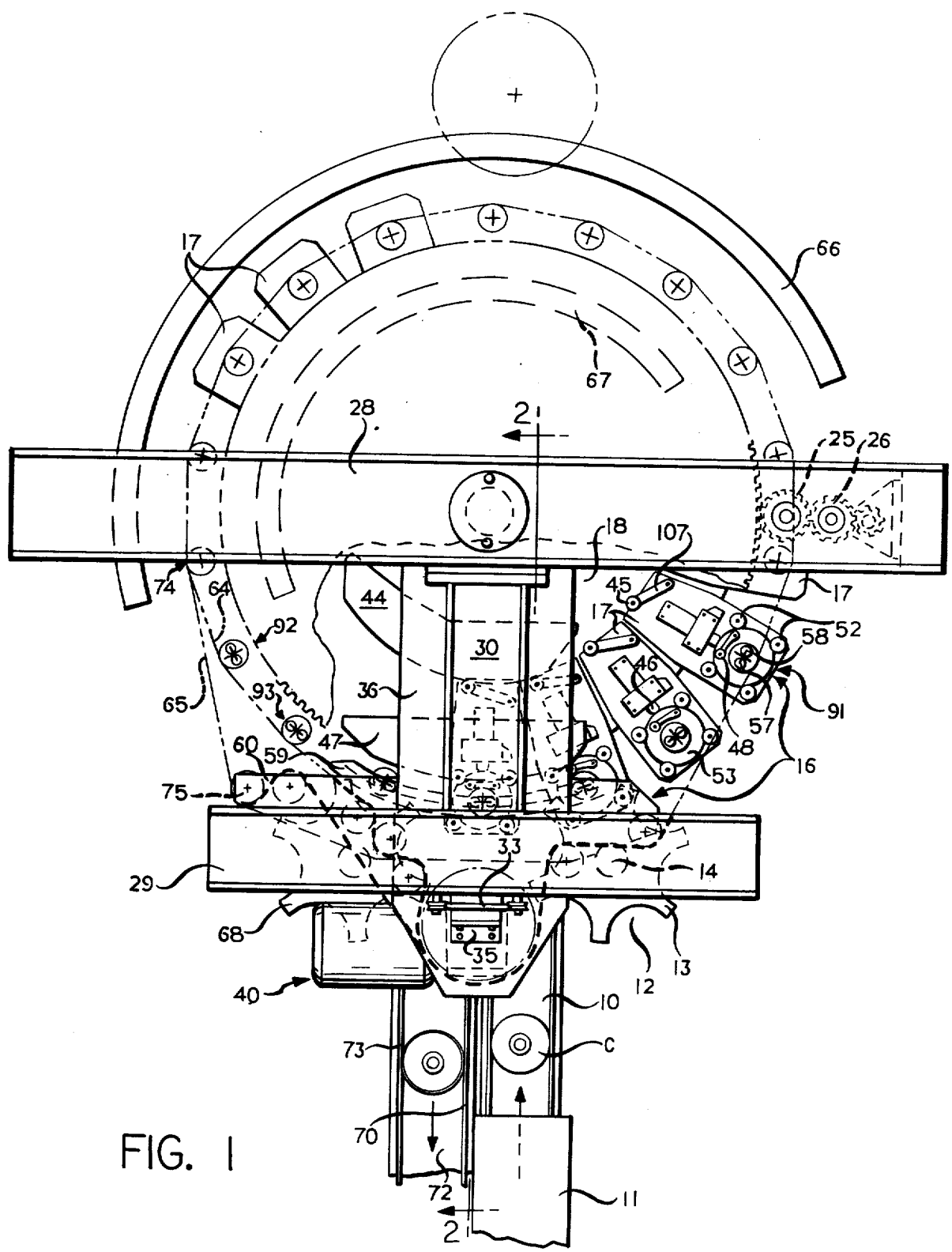
FIG. 1 is a schematic top plan view of the bottle labeling apparatus of the invention.
Figure 2:
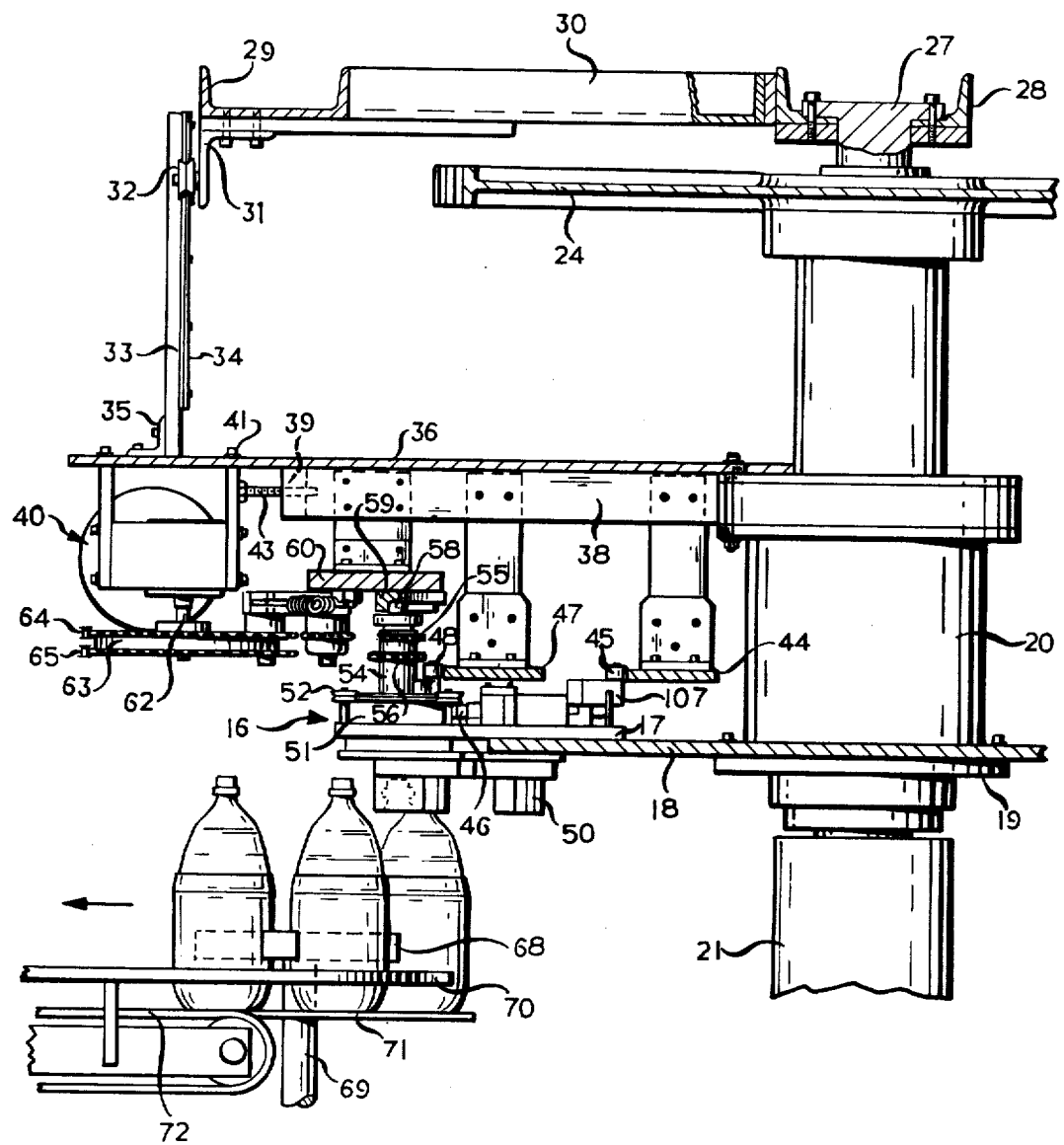
FIG. 2 is a vertical, sectional view taken at line 2—2 of FIG. 1 on an enlarged scale.

With reference to FIGS. 1 and 2, it can be seen that the apparatus of the invention will be described in conjunction with the application of a sleeve of shrinkable plastic material to a container. The emphasis in the present application is on the mechanism for handling the bottles as they enter and are carried through the system, and in particular, the details of the chuck and jaw operating mechanism.

Figure 3:
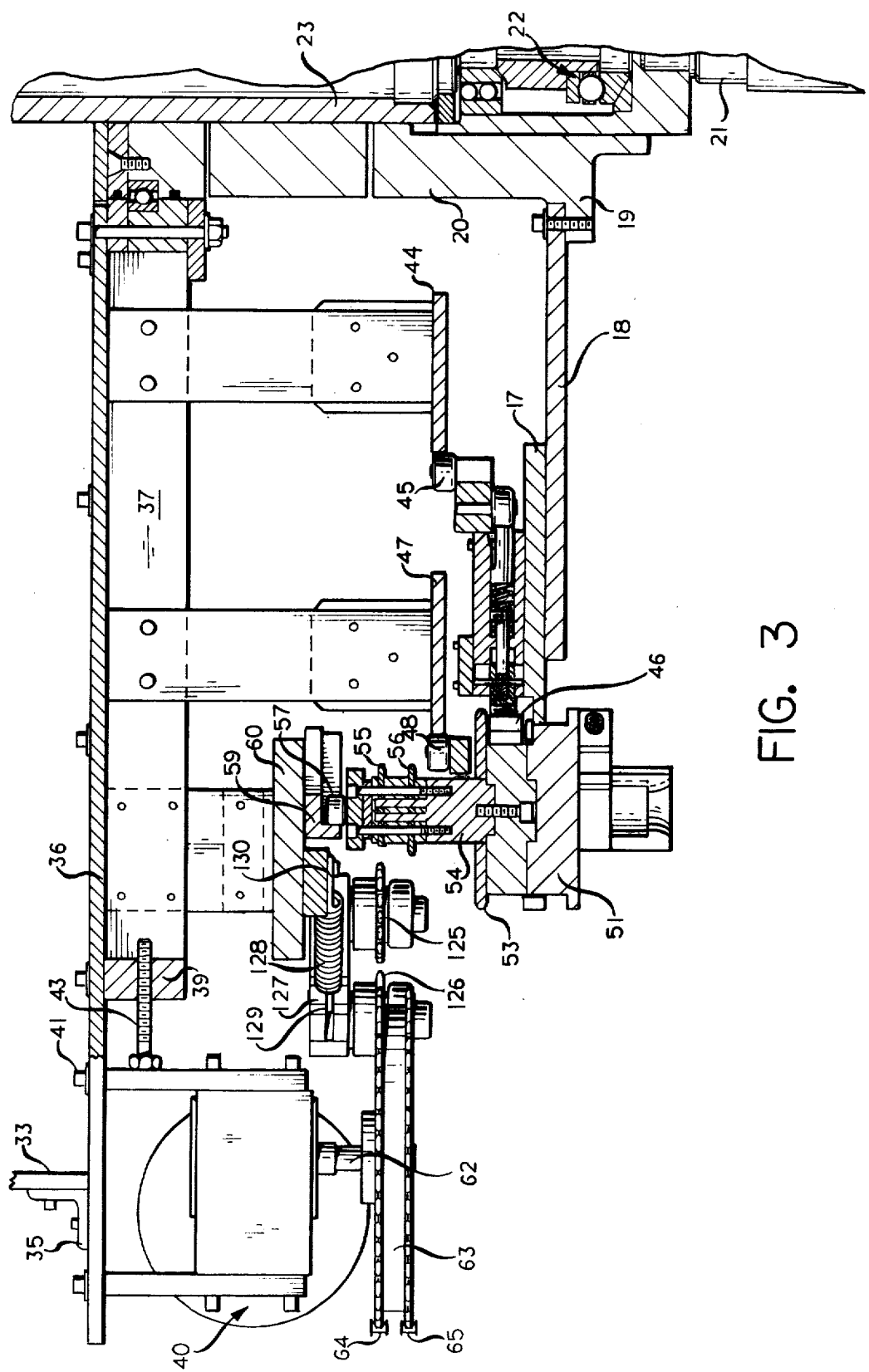
FIG. 3 is a sectional view similar to FIG. 2, on an enlarged scale, taken at line 3—3 of FIG. 4.

With particular reference to FIG. 1, which is a plan view of the overall apparatus utilizing the invention, it can be seen that glass containers C positioned upright on a moving conveyor 10 are shown exiting from a preheat oven 11. As the containers move in the direction of the arrow shown at the bottom of FIG. 1, they will be carried by the conveyor 10 into and be engaged by pockets 12 of an inlet starwheel 13. The starwheel 13 is mounted to and rotates about a vertical axle 14. The bottles or containers C, as they are moved by the starwheel 13, will be moved into a position designated 15 in FIG. 1, at which time the bottle will be grasped by its neck by a chuck mechanism, generally designated 16. As can readily be seen, there are a plurality of chuck mechanisms, only a few of which are shown in any detail. Schematically shown in various detail, there are eighteen chuck mechanisms in the apparatus illustrated in FIG. 1. The details of the chuck mechanism will be explained later. Each of the chuck mechanisms 16 is mounted on a generally horizontal plate 17. The eighteen plates 17 are mounted on a circular plate or disc 18. The disc 18, as perhaps best shown in FIG. 3, is mounted to an annular ledge 19 of a central hub portion 20. The hub 20 is rotatably supported relative to a vertical shaft 21 by bearings 22 shown in FIG. 3. The hub 20 and the vertical cylinder 23, to which it is fixed, is driven from above by a large diameter bull gear 24. The bull gear 24, as best seen in FIG. 1, is driven by a pinion 25, which in turn is driven by a gear 26. The gear 26 is mounted on a shaft which is driven by a motor (not shown).

The main support shaft 21, which is stationary, extends vertically upward through and coaxial with the cylinder 23 and at its upper end 27 is bolted to a cross beam 28. At the same elevation as the cross beam 28, and parallel thereto, there is a shorter beam 29. The beams 28 and 29 are fixed relative to each other by an overhead support member 30. The beam 29 at its one edge carries an angle bracket 31. The bracket 31 in turn carries and supports a pair of spaced apart guide roller devices 32 similar in configuration to pulleys. The rollers 32 serve as reinforcing guides or steadying devices for a vertically upstanding bar 33, which has an edge plate 34 riding between the rollers 32. The bar 33 at its lower end is connected by an angle bracket 35 to a drive motor and cam plate supporting platform 36. The platform 36 extends outwardly from the cylinder 20. However, since the cylinder rotates and the platform 36 does not, bearings are provided between the two. The underside of the platform 36 carries a pair of parallel bars 37 and 38 bolted thereto. A cross bar 39 extends between the ends of the bars 37 and 38 that are remote from the hub. The platform 36 at its extended end, as viewed in FIGS. 2 and 3, has a combined gear box and motor unit 40 bolted to the under surface thereof by a set of bolts 41 extending through elongated slots 42 therein. An adjusting screw 43 extends between the unit 40 and the bar 39. In addition to the unit 40 being suspended from the under surface of the platform 36, the platform also supports a first cam plate 44, whose function is to engage a follower 45, which in turn biases a detent 46 into a slot provided in the outer hub portion of the chuck mechanism 16. The platform 36 also supports a second cam plate 47. The fixed cam plate 47 is positioned to be engaged by a follower 48. The follower 48, when engaged with the cam 47, will open the jaws 49 and 50 of the chuck mechanism 16.

The jaws 49 and 50 are mounted to the lower portion of a generally circular hub 51 of the chuck mechanism 16. The hub 51 is mounted for rotation relative to the horizontal plate 17 by the fact that the plate 17 supports four equaspaced pulley-like rollers 52. In configuration, the rollers 52 are similar to the rollers 32 previously described. The rollers 52, however, are engaged by a circular plate or disc 53, whose outer peripheral edge is sharp and therefore engageable within the crevices of the rollers 52. In this manner, the hub 51 and the jaws which are supported from the hub are rotatable relative to the plate 17 and the disc 18, which supports all of these mechanisms. Extending vertically above the hub 51 and coaxial therewith is a shaft 54. The shaft supports, coaxially with respect thereto, a pair of spaced apart sprockets 55 and 56. Above the sprockets 55 and 56, the shaft 54 supports a pair of cam follower rollers 57 and 58. The cam follower rollers 57 and 58 engage a third stationary cam 59. The cam 59 is supported from a horizontal plate 60, which in turn is supported beneath the platform 36. Not only does the plate 60 support the cam 59, but also supports a plurality of shafts to which are mounted a plurality of idler sprockets to be described in greater detail later in conjunction with FIGS. 3–5.

The motor and gear box unit 40 has a downwardly extending output shaft 62 to which a large diameter dual sprocket 63 is connected. The dual sprocket 63 is in engagement with a pair of endless chains 64 and 65 schematically shown in FIGS. 1 and 4. The chains 64 and 65 engage the sprockets 55 and 56 on all of the chuck mechanisms when the chuck mechanisms are outside of the zone of the cams 44, 47 and 59. Thus, the two chains drive and rotate the chuck mechanism 16 throughout generally 240° of the movement of the chucks about the central axis of the shaft 21.

It is during this movement that the sleeves are assembled onto the bottles and are shrunk by the influence of the radiant heaters 66 and 67. These heaters are described in greater detail in copending application Ser. No. 529,242. Heater 66, of which there are three arcuate sections, extend approximately 180° about the circumference of the path of travel of containers when being moved by the mechanism of the invention. The heaters 67 (only partially shown) are positioned within the circumference of the bull gear 24, and thus are only shown in a small section as dotted relative to the path of travel of the containers. The heaters 67, of which there are also three in number, match the circumferential degree of coverage as do the heaters 66. Thus, the containers with the sleeves applied thereto are rotated about their vertical axes in the chucks 16 as they are moved between the two sets of heaters 66 and 67 to effect the shrinkage of the sleeves to the contour of the exterior of the bottles. When the containers have moved through the zone between the heaters, they will be stopped in their rotation by the fact that the drive chains 64 and 65, and in particular chain 65 which is the lower of the two drive chains, will be guided away from engagement with the sprocket 56 of the heads or chucks 16 as they approach the bottle release point. This release point will occur when the container carried by the chuck has approached and is to be engaged by an exit starwheel 68. This position is indicated by the position of the container to the right as viewed in FIG. 2. The starwheel 68 is driven through a support shaft 69, which is rotated by a timed mechanism (not shown). The containers C, as they exit in the pockets of the starwheel 68, are guided by a curved rail 70 as the bottles slide over the bottom plate 71. The plate 71 is stationary and located opposite the ends of the incoming conveyor 10, as well as opposite an exit conveyor 72. The conveyor 72 is driven in the direction of the arrow shown thereon in FIG. 1. A second guide rail 73 overlying the exit conveyor 72 guides the finished, sleeved containers away from the sleeving apparatus.

Figure 4:
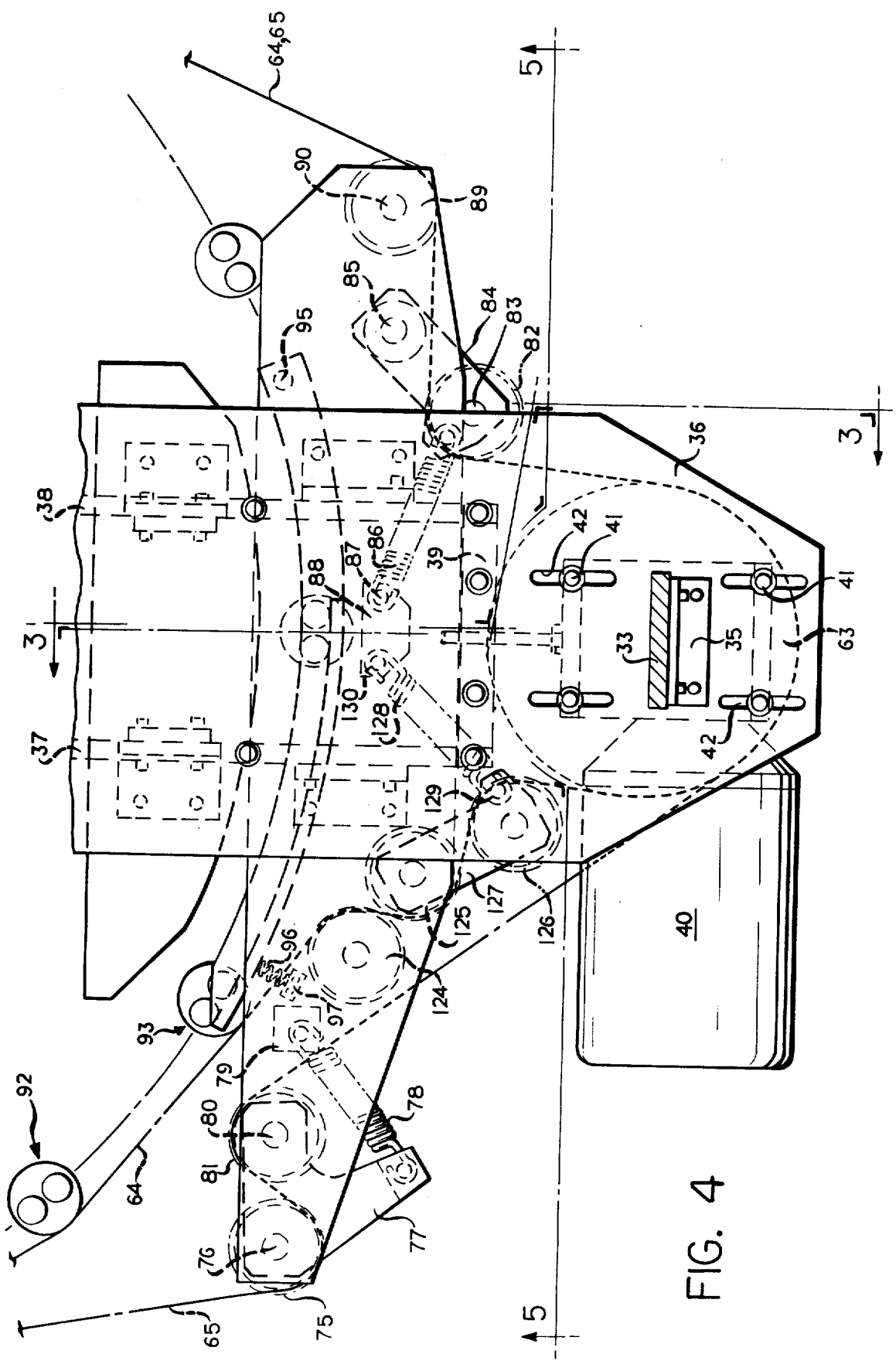
FIG. 4 is a schematic top plan view of the left hand portion of FIG. 3.
Figure 5:
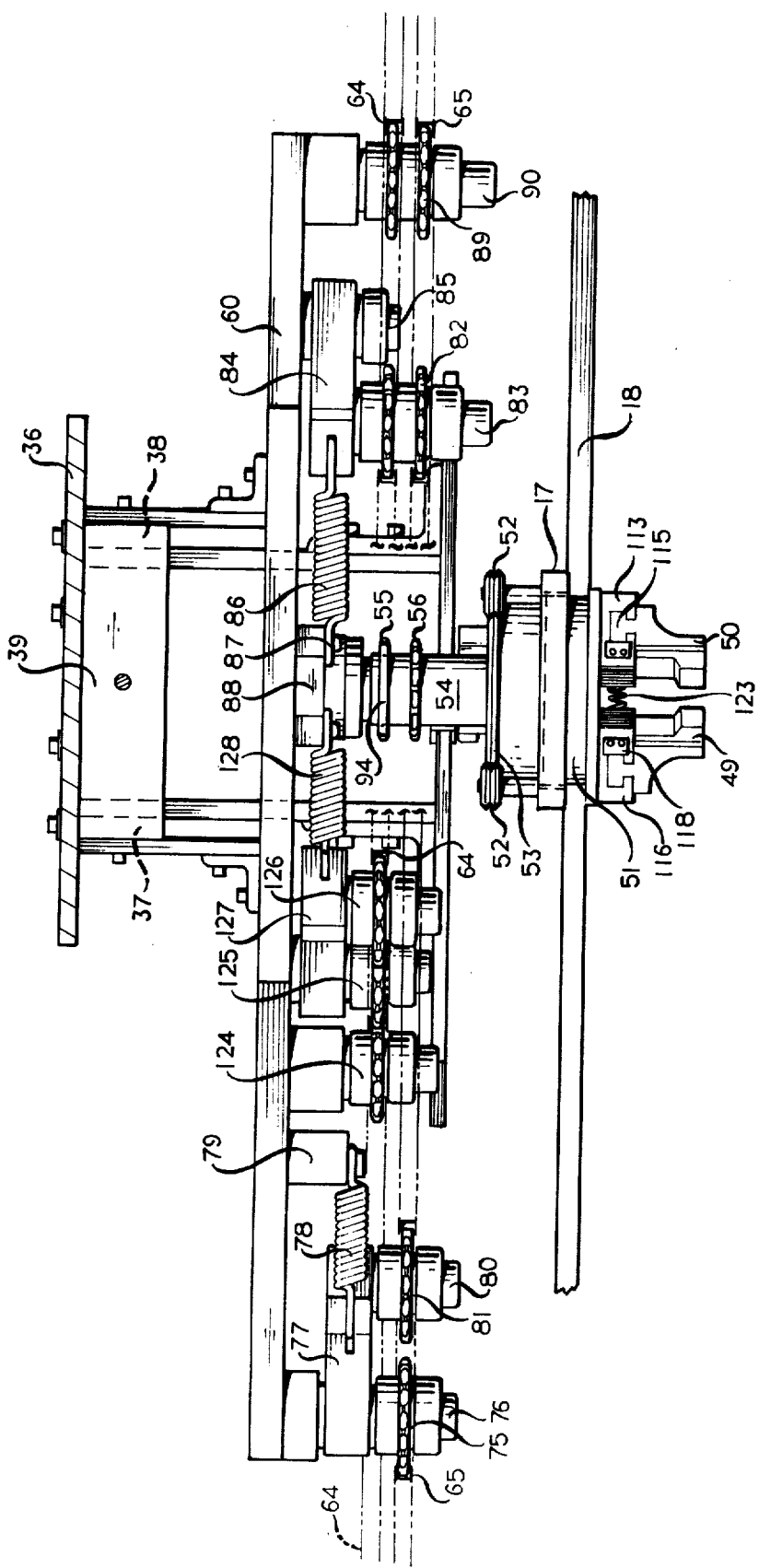
FIG. 5 is a cross-sectional view taken at line 5—5 of FIG. 4.

As previously explained, both the chains 64 and 65 engage the sprockets 55 and 56, respectively, of all of the chucks 16, particularly during the movement of the chucks through the zone of the heaters 66 and 67, at which time the chains will cause the chucks to rotate about their vertical axes. It should be kept in mind that the follower rollers 57 and 58 at this time are free and clear of the cam 59. It should be pointed out, however, that the chain 65, which is the lower of the two chains, leaves the sprockets 56 at the position indicated by the arrow 74. At this time the chain 65, as best seen when viewing FIGS. 4 and 5, is led to an idler sprocket 75. The sprocket 75 is mounted on a vertical axle 76, which extends downwardly from and is fixed to the plate 60. The sprocket 75, however, rotates on the axle 76 and the axle 76 also rotatably supports a crank arm 77. The outer end of the crank arm 77 is connected to one end of a spring 78 with the other end of the spring 78 connected to a fixed support 79. The crank arm 77 also carries an axle 80, which rotatably supports an idler pulley 81. As can best be seen in FIG. 4, the chain 65 passes around the sprocket 75 and then is looped back around the sprocket 81. The chain 65 then runs around the lower member of the dual drive sprocket 63.

After engagement with the drive sprocket 63, the chain 65 will pass around a third idler sprocket 82, which is mounted on a vertical axle 83. The axle 83 depends downwardly from one end of a crank arm 84. The arm 84 is pivotally mounted to a vertical axle 85, which extends downwardly from the under surface of the plate 60. The arm 84 adjacent the end which supports the sprocket 82 is connected to one end of a tension spring 86. The other end of the spring 86 is connected at 87 to a fixed block 88 carried by the under surface of the support plate 60. The chain 65, after passing around the sprocket 82, continues to the right, as viewed in FIG. 4, and passes about the outside of a fourth sprocket 89. The fourth sprocket 89 is mounted to a vertical axle 90, which again is mounted to the under surface of the support plate 60. After passing from around the fourth sprocket 89, the chain 65 will re-engage the sprocket 56 on the chuck 16 at the location of the arrow 91, as viewed in FIG. 1. At this point, and from then on to the location 74, the chain 65 will continuously rotate the chuck mechanisms 16. It can be seen that the tension in the chain 65 is maintained by the springs 78 and 86.

The second and upper chain 64 is driven in much the same manner as chain 64, and does go about and is driven by the dual sprocket 63. However, its function is somewhat more than the function of just rotating the chucks during the same period as the chain 65 would rotate the chucks. The chain 64 functions to properly position and orient the chucks in a specific manner prior to the chucks being opened to release a sleeved container and remain open to receive a new container.

Once the new container is grasped, it will travel through the rest of the cycle of the sleeving operation.

As best seen in FIGS. 1 and 4, the chain 64 will remain in engagement with the sprocket 55 of the chuck 16 through two additional positions, designated 92 and 93. While in continued engagement with the sprocket 55, the chain 64 will continue to rotate the chucks until the chain arrives at, and has rotated the sprocket 55, so that the point where the teeth on the sprocket 55 are discontinued. This gap in the teeth is shown clearly in FIG. 7 at 94. From the position 74 in FIG. 1 to the position 93, the length of travel of the chain is such that it will be assured of rotating the chuck with which it is engaged through an angle approaching 360°. Obviously, once the drive sprocket has turned to a specific position, the chain 64 will no longer rotate the chuck 16. At this time, and as the chuck has reached the point 93, the rollers 57 and 58 of the chuck 16 will engage the cam track 59.

Figure 7:
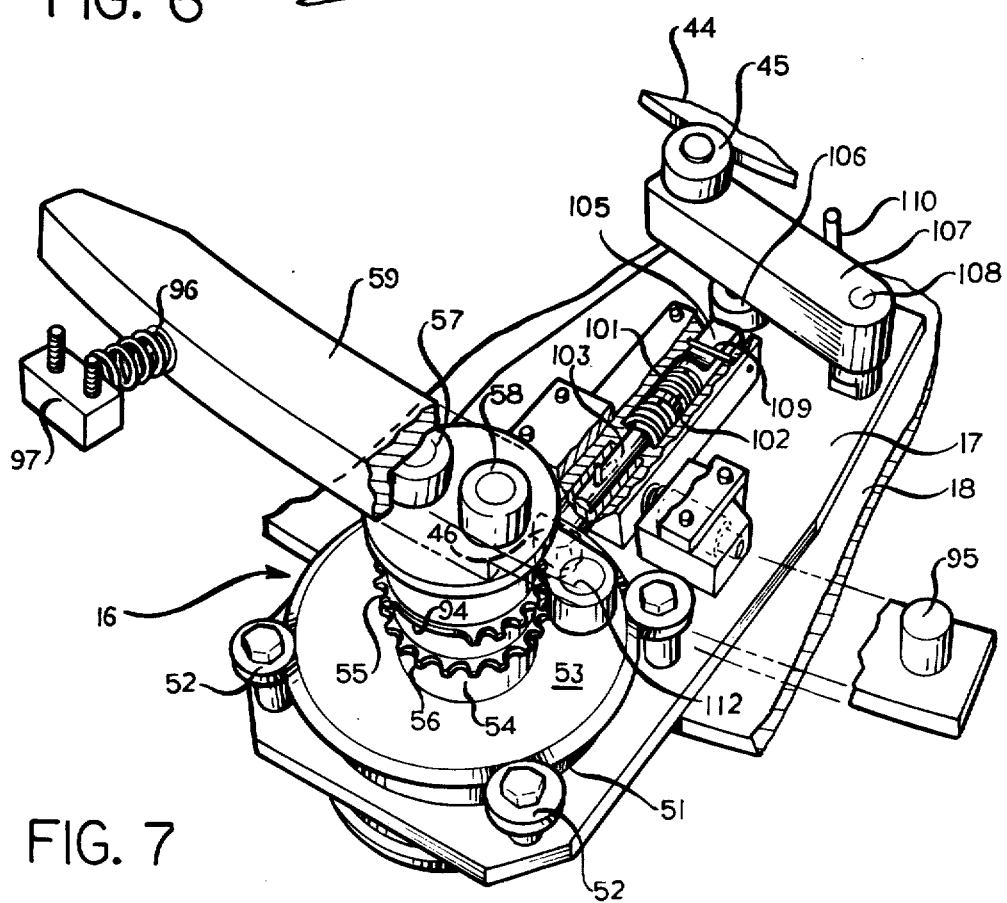
FIG. 7 is a perspective view of the chuck mechanism of FIG. 6, with a pair of cams shown in operating position.

As best shown in FIG. 7, the curved cam track 59 is pivoted to the pin 95, which is mounted to the under side of the support plate 60. As viewed in FIGS. 4 and 7, the post 95 is toward the right hand side of the area where the chuck is oriented and held in the orientation. To the left side, where the chuck enters the cam track 59, the track is biased by a spring 96 in the direction of the rollers 57 and 58 to maintain the rollers and the cam track in fairly precise alignment. The spring 96, which acts against a fixed stop 97, is biased in the position shown in FIG. 7 and FIG. 4 for the purpose of permitting the track 59 to shift counterclockwise about the pivot post 95 in the event that the chuck 16 that has arrived to enter the cam surface of the cam 59 has not been completely oriented by the chain and locked in the oriented position by the locking detent 46.

Figure 6:
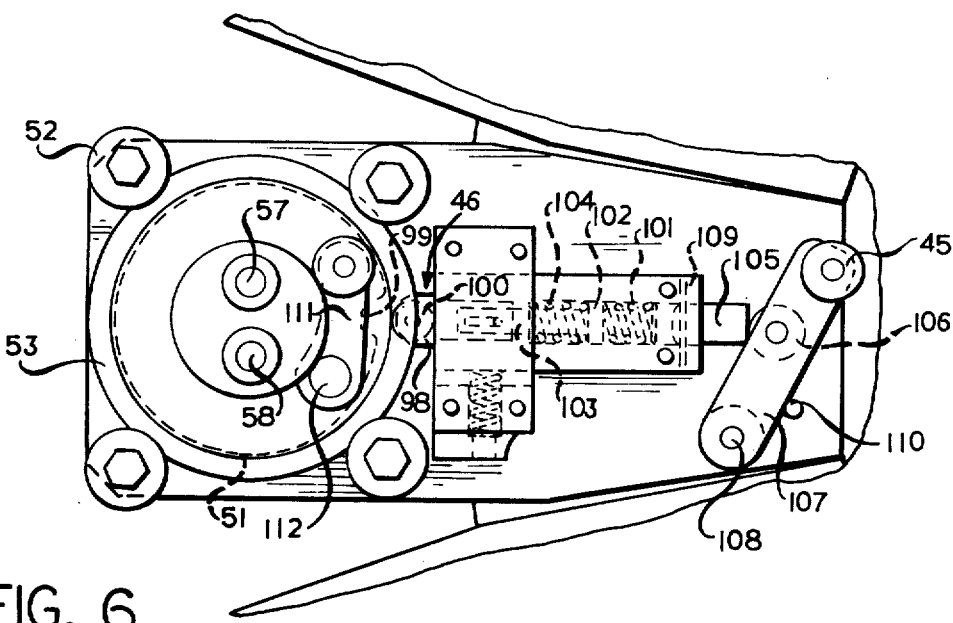
FIG. 6 is a top plan view of a single bottle chuck mechanism.

The locking detent 46 actually takes the shape of a double chamfered head 98 that is adapted to fall into a complementary notch 99 formed in the side of the hub 51 of the chuck 16. The notch 99 is formed in the side of the hub 51 and beneath the notch 99 the hub is circular permitting the roller 100, which is rotatably mounted on the head 98, to ride on the external surface of the hub as the hub is rotated by the chain 64. However, at the time the chain 64 enters the area 94 of the sprocket 55, where the teeth of the sprocket are absent, the head 98 of the detent 44 will fall into the notch 99. The head 98 is biased to the left, as viewed in FIG. 6, by a spring 101, which is engaged by a head 102 of a shaft 103 that is connected to the head 98. As shown in FIG. 6, the detent 46 is in its retracted position where the spring 101 and a second spring 104 hold the head in the retracted position. An actuating pin 105, which is in engagement with a roller 106, is carried by an arm 107, which is pivotally connected to the horizontal plate 17 by a pivot pin 108. The springs 101 and 104, which normally bias the actuating pin 105 to the right as viewed in FIG. 6, are prevented from moving the pin 105 beyond a certain point by the interpositioning of a cross pin 109, which extends through a horizontal slot in the pin 105. Additionally, the arm 107, when free from constraint by the cam 44 riding against the follower roller 45, is prevented from clockwise rotation to any great extent by a vertical stop pin 110. Thus, the arm 107 and the roller 45 carried thereby are prevented from getting too far out of position once the roller 45 leaves the cam 44. Thus, the roller 45 will still be capable of engaging the cam at the opposite end of the rotation of the turret and operate functionally to bias the detent 46 to lock the hub 51 in a specifically oriented position for the chuck 16 to be opened and later closed about the necks of the containers being handled through the system. Once the rollers 57 and 58 have entered the cam 59, the hub 51 will be oriented and locked by the detent 46 entering the recess 99 in the hub.

Figure 10:
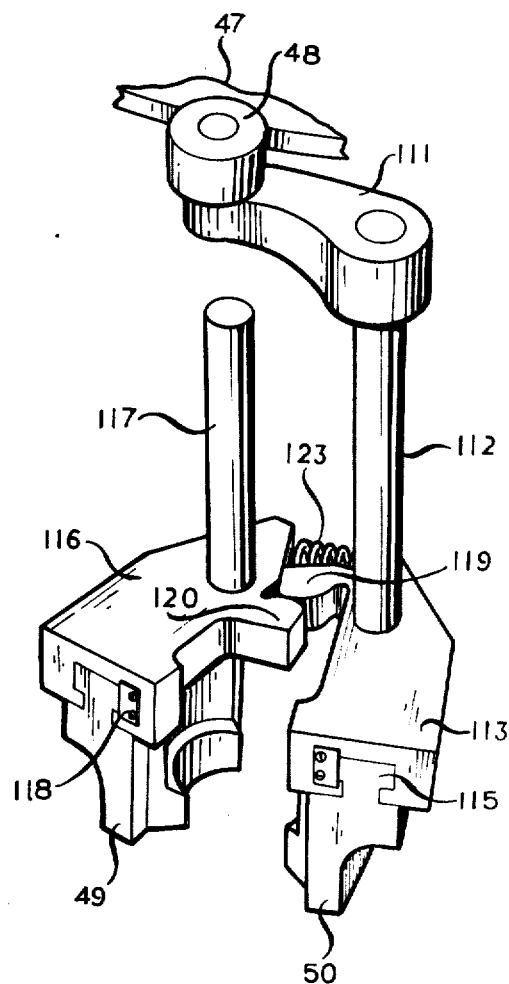
FIG. 10 is a perspective view of the single set of jaws of FIG. 8 in cammed open position.

At about this same time, a cam 47 will engage a follower roller 48. The follower roller 48, as best seen in FIGS. 6 and 10, is carried at one end of a crank arm 111. The arm 111 at its end opposite the roller 48 is connected to a vertical shaft 112. The shaft 112 extends down through a vertical opening in the hub 51 and at its lower end carries a jaw holder 113. The jaw 113 is formed with an elongated groove 114 within which a tongue portion 115 of the jaw 50 is intended to be fitted. The opposite jaw 49 is similarly mounted by a tongue and groove arrangement in a jaw holder 116. The holder 116 is mounted on the lower end of a vertical shaft 117, which is supported by and rotatable with respect to the hub 51. The jaws 49 and 50 are held within the slots formed in the holders 116 and 113 by keepers 118. The jaws holders 113 and 116 are formed with interengaging abutment members 119 and 120, respectively. These members 119 and 120 extend inwardly toward each other when viewed from above and have complementary rounded surfaces 121 and 122, which are maintained in rolling contact with each other. Thus, it can be seen that the two jaws 49 and 50 and their holders 113 and 116 may rotate with respect to the axes of the shafts 112 and 114. (See FIGS. 8 and 10.)

Figure 8:
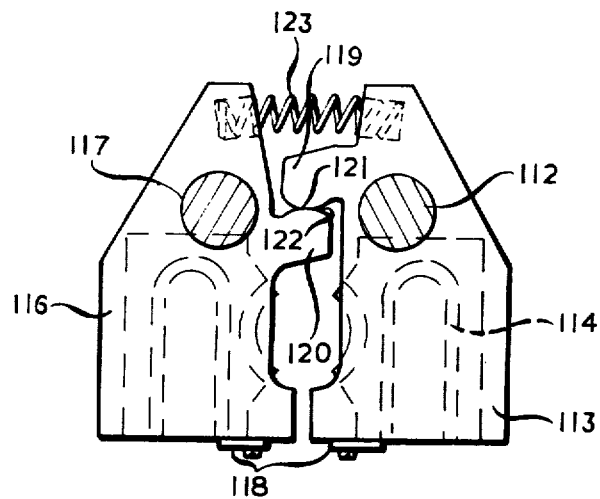
FIG. 8 is a plan view of a single set of gripping jaws.
Figure 9:
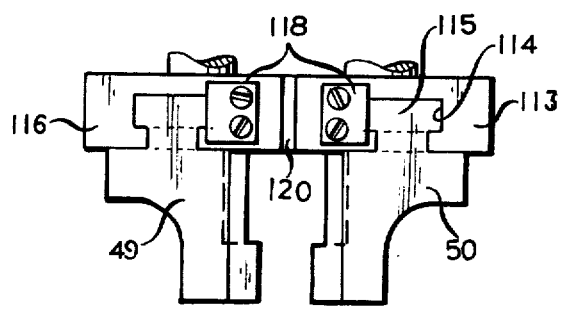
FIG. 9 is a side view of the jaws of FIG. 8.

During most of the cycle of operation of the apparatus, the jaws are being held in engagement with necks of containers that are positioned between the jaw members and held in contact therewith by a compression spring 123. As best seen in FIGS. 8-10, the facing portions of the jaws 49 and 50 are configured to embrace the circular neck of a glass container or bottle. Their faces are provided with inward ledges that will extend beneath the transfer bead of the container. When the cam 47 is engaged by the roller 48, as shown in FIG. 10, the two holders 113 and 116 will be rotated relative to each other to the position shown in FIG. 10. This is the position of the jaws 49 and 50 at the point where the sleeved containers are released to the starwheel 68, and the jaws will remain open until the starwheel 13 has brought a new container into position with its neck between the jaws. It is at this point that the roller 48 will reach the end of the cam 47, and the jaws will be permitted to close about the container neck positioned therebetween.

As previously explained, the top chain 64, which engages the sprockets 55 carried by the shaft 54, and particularly during the interval when the bottom chain 65 has released the chucks 16, will rotate the chucks so that the rollers 57 and 58 will line up with cam 59 and toothless portion 94 of the sprocket 55 will cause the chain to slip relative to the chuck. It is at this time that the chuck is locked by the detent in the proper position to release and to pick up containers. Just beyond this position 93, the chain 64 will pass around an idler sprocket 124 and about a second idler sprocket 125, thence about a sprocket 126, which is carried at the end of an arm 127. The arm 127 pivots about the axle of the sprocket 125 and the sprocket 126, which is pivoted to the end of the arm 127, has the chain passed thereby and thence around the upper run of the dual sprocket 63. The support or mount for the arm 127 is spring biased by a spring 128, whose end 129 is fixed to the arm 127 while its other end 130 is fixed to the block 88. As previously stated, the block 88 is mounted to the under side of the plate 60. After the upper or top chain 64 passes about the dual sprocket 63, it passes about the dual sprockets 82 and 89 and in effect follows, from a plan view, the same path as the lower chain 65. While the sprockets 82 and 89 were described as individual sprockets earlier, it should be pointed out that they are coaxial with and concentric with respect to the second pair of sprockets which are engaged by the chain 64. Again, the arm 84 being a biased pickup arm will provide tension to both the chains 64 and 65 while at the left side, as viewed in FIGS. 4 and 5, the spring 128 will provide pickup tension for the chain 64 while the chain 65 is maintained under tension by the spring 78.

In the operation of the above-described apparatus, it can be seen that the power for rotating the turret containing the chucks comes through the gears 25 and 26, whereas the power to rotate the chucks during their movement about the circumference of the turret is provided by the motor and gear box unit 40 driving the dual sprocket 63. It should be pointed out, however, that this rotation of the chains 64 and 65 alternatively may be accomplished by having the dual sprocket 63 driven by a direct chain drive coming from a chain extending about an annular sprocket mounted on the central hub 20. Thus, it can be seen that with the rotation of the chuck-supporting plate 18 and the hub 20 in a counterclockwise direction, as viewed in FIG. 1, the dual sprocket 63 would be rotated in a counterclockwise direction at the same relative velocity, depending on the relative sizes of the sprocket 63 and the annular sprocket which would be applied to the hub 20. Regardless of the method of driving the chains, it can be seen that the chucks will be opened during that interval that the cams shown in FIG. 1 are engaged by their followers, and the chucks will be closed thereafter to carry the containers by their necks through the cycle of having the sleeves applied from beneath and rotation of the sleeve and container through the shrink cycle between the ovens 66 and 67. At the completion of the shrink cycle, the containers will have arrived at the exit point where the chucks will open and release the containers to the exit conveyor.

While the foregoing detailed description of the invention will provide sufficient information to one skilled in the art to utilize the invention, other modifications may be resorted to within the spirit and scope of the claims appended thereto. Further, the description has been primarily related to the handling of preheated or ambient glass containers; however, the apparatus of the invention could be used to provide shrink sleeves to any article that can be grasped and released similarly to the neck of a bottle.

We claim:

1. Apparatus for handling containers through a circular path of travel where the containers are held by their necks while a sleeve of heat-shrinkable plastic is telescoped thereon and then heated to shrink the sleeve into bottle-conforming relationship, the improvement in the container neck-grasping mechanism comprising a generally circular, horizontal platform, means for rotating said platform about a central vertical axis, a plurality of circumferentially spaced, neck-grasping chucks, means connected to said chucks for mounting said chucks on said platform, said chuck mounting means comprising a radially-extending plate, a chuck holder extending through an opening in said plate, means rotatably supporting said holder in said plate, spring-biased, actuated detent means on said plate, a first stationary cam means positioned to be engaged by said cam follower means to bias said detent against said holder, a notch in said holder for engagement with said detent in a specific rotational orientation of said holder through a portion of the rotation of said platform, second stationary cam means for opening the chucks to release a sleeved container and later close about a bare container, and means for rotating said chucks at selected circumferential positions of said chuck holders during their movement with said plates.

2. The apparatus of claim 1, wherein said spring-biased detent means includes a roller mounted on the end thereof for engaging the side of a holder as the holder is rotated prior to the bottle release position.

3. The apparatus of claim 2, wherein said detent means comprises a radially-extending pin having a holder-engaging outer detent head, means for guiding said pin in a longitudinal direction, an arm pivotally mounted to said plate, a cam follower mounted on said arm, a roller mounted on said arm intermediate its length in engagement with said pin, means mounting said pin guiding means to said plate for limited movement normal to the axis of said pin.

4. The apparatus of claim 1, wherein said chuck means comprises a pair of complementary jaws, parallel vertical shafts supporting each jaw, and means for pivoting said jaws about the axes of the shafts for opening and closing the jaws.

5. The apparatus of claim 4, further including spring means normally biasing said jaws in closed relationship.

6. The apparatus of claim 4, including interengaging abutment means between said jaws and said means for pivoting said jaws comprises a crank connected to one of said shafts.

7. The apparatus of claim 6, further including a cam follower mounted on said crank arm and cam means engageable by said cam follower upon movement of said chucks into bottle release and pickup positions.

8. The apparatus of claim 1, wherein said means for rotating said chuck holders comprises a first sprocket mounted on the vertical axis of said holder, a first endless chain extending about the circumference of said platform in engagement with a plurality of said holders and means for driving said chain to effect rotation of said holders.

9. The apparatus of claim 8, including means for supporting and guiding said chain out of engagement with the sprockets on the holders through that portion of their travel when the holders are to be non-rotated for releasing and picking up bottles.

10. The apparatus of claim 8, further including a second sprocket mounted coaxial with the first on said holders, and a second endless chain in engagement with said second sprockets.

11. The apparatus of claim 10, wherein said second sprockets are formed with sufficient teeth missing so that the chain disengages the second sprocket at a particular rotational position of said second sprocket.

12. The apparatus of claim 11, wherein said position of the second sprocket and holder where the drive chain disengages the teeth on the sprocket corresponds to the approximate orientation of the holder when releasing or re-engaging the necks of incoming containers.

13. The apparatus of claim 12, wherein said second sprocket and its drive chain engage the sprocket to turn the sprocket and holder to a particular orientation so that said cam follower will enter said first cam to maintain the holder in a fixed, predetermined orientation.

14. The apparatus of claim 13, wherein said first drive chain is guided away from said first sprocket prior to orientation of said holder by said second sprocket.

15. The apparatus of claim 14, wherein both said chains re-engage said sprockets after the chuck holder has picked up an incoming container.

16. In apparatus for handling containers through substantially a 320° annular movement about a central axis where the containers are picked up by their necks and transported in axial alignment with rotating mandrels on a turret and heat-shrinkable sleeves made on the mandrels are transferred to the containers, the containers are rotated about their axes as they are moved through a semi-annular heat zone to shrink the sleeve onto the container and then the sleeved containers are released for movement away from the turret, the improvement in the container-handling system comprising a rotatable, horizontal platform, a plurality of circumferentially-spaced, radially-extending plates mounted on said platform, a rotatable container holder mounted on each plate, chuck means carried by each said holder, means connected to said holders for rotating said holders about their axes while the holders are moved through approximately 260° about the axis of said platform, cam means for actuating said chucks while the holders are in their non-rotating mode and means for locking said holders in a predetermined rotational orientation during their non-rotating mode.

17. The apparatus of claim 16, wherein said holder-rotating means comprises first sprocket on each holder, and a driven chain engaging said sprockets through 220° of the movement of said holders.

18. The apparatus of claim 16, wherein said means for locking the holders in position comprises a spring-biased detent mounted adjacent each holder, cam means for actuating said detent and notch means formed in said holder for receiving said detent when said holder is rotated into a specific angular orientation.

19. The apparatus of claim 18, wherein said detent comprises a radially-extending detent holder, a detent supporting rod extending from said holder, first spring means urging said detent into retracted position, second spring means actuatable to urge said pin into extending position, means for mounting said detent holder to said plate for limited lateral movement in the direction of movement of the plate and means biasing said detent holder in the opposite direction.

* * * * *